(12) United States Patent
Duggal et al.

(10) Patent No.: US 8,538,480 B2
(45) Date of Patent: Sep. 17, 2013

(54) METHODS AND APPARATUS FOR DEVICE APPLET MANAGEMENT ON SMART CARDS

(75) Inventors: Nakul Duggal, San Diego, CA (US); Bryan C. Gurganus, San Diego, CA (US); Carl Qu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 640 days.

(21) Appl. No.: 12/749,848

(22) Filed: Mar. 30, 2010

(65) Prior Publication Data

US 2011/0246547 A1 Oct. 6, 2011

(51) Int. Cl.
*H04M 1/00* (2006.01)
*H04B 1/38* (2006.01)

(52) U.S. Cl.
USPC .......................................... 455/558

(58) Field of Classification Search
USPC ................ 455/550.1, 558, 410, 411
See application file for complete search history.

(56) References Cited

U.S. PATENT DOCUMENTS

| | | |
|---|---|---|
| 6,005,942 A | 12/1999 | Chan et al. |
| 2008/0220743 A1* | 9/2008 | Mora et al. ............... 455/411 |
| 2009/0124251 A1* | 5/2009 | Niccolini ................. 455/425 |
| 2010/0317320 A1* | 12/2010 | Sakargayan ................ 455/410 |
| 2011/0131421 A1* | 6/2011 | Jogand-Coulomb et al. . 713/189 |
| 2011/0263296 A1* | 10/2011 | Baietto et al. ............... 455/558 |

FOREIGN PATENT DOCUMENTS

| | | |
|---|---|---|
| EP | 1993055 A2 | 11/2008 |
| WO | WO9819237 A1 | 5/1998 |
| WO | WO2009027743 A2 | 3/2009 |

OTHER PUBLICATIONS

International Search Report and Written Opinion—PCT/US2011/030524, ISA/EPO—Jul. 8, 2011.

\* cited by examiner

*Primary Examiner* — Nguyen Vo
(74) *Attorney, Agent, or Firm* — Abdollah Katbab (57) ABSTRACT

Methods and apparatus for device applet management on smart cards. A method includes obtaining device applets at a first device, generating a directory structure that identifies platform types and corresponding device applets, and storing the device applets in the directory structure on a smart card so that when the smart card is in communication with a second device supporting a selected platform, device applets associated with the selected platform are accessible to the second device. An apparatus includes a transceiver to obtain device applets at a first device, and a processor generate a directory structure that identifies platform types and corresponding device applets, and stores the device applets in the directory structure on a smart card so that when the smart card is in communication with a second device supporting a selected platform, device applets associated with the selected platform are accessible to the second device.

40 Claims, 6 Drawing Sheets

METHODS AND APPARATUS FOR DEVICE APPLET MANAGEMENT ON SMART CARDS

BACKGROUND

1. Field

The present application relates generally to the operation of wireless communication systems, and more particularly, to methods and apparatus for device applet management on smart cards.

2. Background

Applications (Apps) or device applets, are now available that can be used to provide a wide range of add-on services and features to portable devices. For example, it is now possible for portable devices to download and launch device applets to perform value added functions such as, shopping, searching, position location, providing driving directions or an array of other functions. Carriers and service providers generally offer these device applets to device users for additional fees. Thus, the use of device applets increases the functionality and usability of portable devices and offers device users features and convenience not originally available on the devices themselves.

Currently, when the user downloads device applets to a device having a smart card, e.g. Removable User Identity Module (R-UIM) or CDMA Subscriber Identify Module (CSIM), those device applets are typically stored in device memory and are bound to that device. When the user removes the R-UIM/CSIM from the device and plugs it into a new device, all the device applets downloaded earlier are not available in the new device. When the user tries to download the device applets again, the user may need to pay for those device applets again since the application billing server cannot handle this scenario (e.g. the card on the new device is recognized as a totally different user). Furthermore, when the user plugs in a different card to the same device and then downloads new device applets, conflicts between the existing device applets and the newly downloaded device applets arise due to limitations of various device applet storage implementations Therefore, it would be desirable to have a mechanism that operates to allow device applets to be stored on a smart card in such a way as to overcome the problems associated with conventional systems as described above.

SUMMARY

In one or more aspects, a device applet management system, comprising methods and apparatus, is provided that operates to allows device applets to be stored on a smart card such that the stored device applets can be launched from any device that is in communication with the smart card.

In an aspect, a method is provided for managing device applets on a smart card. The method comprises obtaining one or more device applets, generating a directory structure that identifies one or more platform types, and for each platform type identifies corresponding device applets from the one or more device applets, and storing the one or more device applets in the directory structure on a smart card so that when the smart card is in communication with a second device that supports a selected platform type, the corresponding device applets associated with the selected platform type are accessible to the second device.

In an aspect, an apparatus is provided for managing device applets on a smart card. The apparatus comprises a transceiver configured to obtain one or more device applets, and a processor coupled to the transceiver and configured to generate a directory structure that identifies one or more platform types, and for each platform type identifies corresponding device applets from the one or more device applets, and to store the one or more device applets in the directory structure on a smart card so that when the smart card is in communication with a second device that supports a selected platform type, the corresponding device applets associated with the selected platform type are accessible to the second device.

In an aspect, an apparatus is provided for managing device applets on a smart card. The apparatus comprises means for obtaining one or more device applets, means for generating a directory structure that identifies one or more platform types, and for each platform type identifies corresponding device applets from the one or more device applets, and means for storing the one or more device applets in the directory structure on a smart card so that when the smart card is in communication with a second device that supports a selected platform type, the corresponding device applets associated with the selected platform type are accessible to the second device.

In an aspect, a computer program product is provided for managing device applets on a smart card. The computer program product comprises a computer-readable medium embodying codes executable by a processor to obtain one or more device applets, generate a directory structure that identifies one or more platform types, and for each platform type identifies corresponding device applets from the one or more device applets, and store the one or more device applets in the directory structure on a smart card so that when the smart card is in communication with a second device that supports a selected platform type, the corresponding device applets associated with the selected platform type are accessible to the second device.

In an aspect, a method is provided for managing device applets on a smart card, the method comprises detecting access to a smart card, reading a directory structure from the smart card that identifies one or more platform types, and for each platform type identifies corresponding device applets, determining from the directory structure one or more device applets associated with a selected platform type, and providing access to the one or more device applets.

In an aspect, an apparatus is provided for managing device applets on a smart card. The apparatus comprises means for detecting access to a smart card, means for reading a directory structure from the smart card that identifies one or more platform types, and for each platform type identifies corresponding device applets, means for determining from the directory structure one or more device applets associated with a selected platform type, and means for providing access to the one or more device applets.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes implementations of a device applet management system that operates to allow device applets to be stored on a smart card such that the stored device applets can be launched from any device that is in communication with the smart card. For example, the system operates to allow device applets downloaded to a first device to be stored on a smart card for later execution on a second device. The system is especially well suited for use with mobile devices, but may be used with any type of device.

Figure 1:
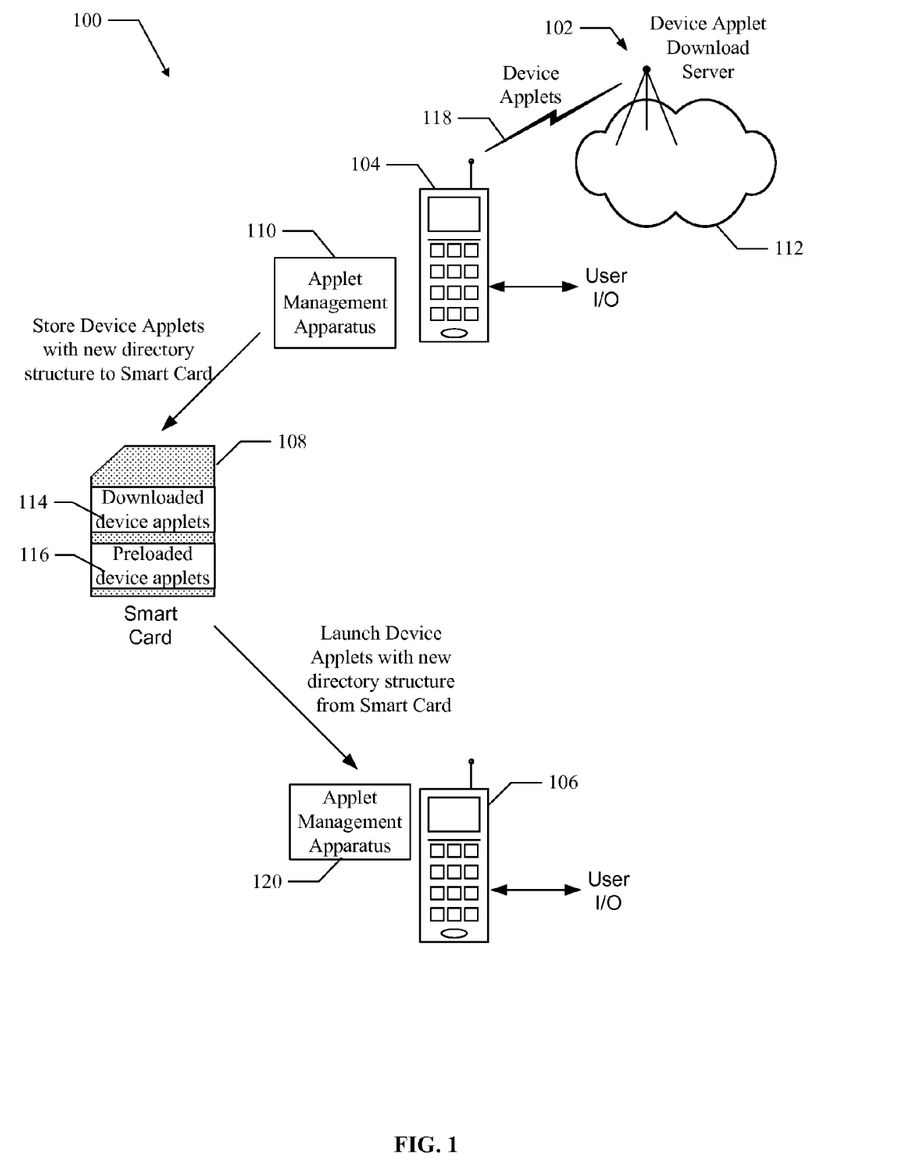
FIG. 1 shows a communication system that illustrates aspects of a device applet management system.

In various implementations, the device applet management system operates to provide one or more of the following functions.
1. Eliminates the requirement for users to re-download previously purchased device applets for use with a different device.
2. Eliminates the requirement for users to repurchase previously purchased device applets when using a different device.
3. Provides a framework that is useable with any application platform and operating system.
4. Allows operators to issue smart cards with pre-loaded device applets for differentiation and branding.
5. Provides for enhanced smart cards that are operable to store the following.
   a. Operator provisioning/configuration
   b. User preferences/configuration
   c. Device applets FIG. 1 shows a communication network 100 that illustrates aspects of a device applet management system. The communication network 100 comprises device applet download server 102, portable devices 104 and 106, smart card 108, and applet management apparatuses 110 and 120, which are provided at the devices 104 and 106, respectively. The device applet download server 102 may be part of any type of communication network 112 and allows device applets to be transmitted between the network 112 and the devices 104 and 106.

The devices 104 and 106 comprise mobile telephones, PDAs, notebook computers, pagers, email devices, or any other type of device that is operable to communicate with the network 112. The device 104 is in communication with the network 112 via wireless communication link 118, which allows data, voice or other information to be wirelessly transmitted between the network 112 and the device 104. The wireless communication link 118 comprises forward communication channels, reverse communication channels, paging channels, control channels, broadcast/multicast channels and any other type of communication channel that may be used to communicate information between the network 112 and the device 104.

The device 104 comprises the device applet management apparatus 110 which is in communication with the smart cart 108. For example, the smart card 108 is installed into the device 104 so that the device applet management apparatus 110 can store and retrieve information to/from the smart card 108.

During operation of the device applet management system, device applets downloaded to the device 104 are stored in the smart card 108 utilizing a directory structure generated by the device applet management system. For example, device applets downloaded from the device applet download server 102 are received at the device 104 and the device applet management apparatus 110 operates to format the device applets into the directory structure to store these device applets on the smart card 108. In one implementation, the device applets comprise downloaded device applets 114 or preloaded device applets 116.

In various implementations, the device applet management apparatus 110 operates to store device applets on a smart card, such as a Universal Integrated Circuit Card (UICC) by creating new a DF-Device_applets (dedicated file device applets) directory that comprises elementary files (EFs) under the CDMA2000 Subscriber Identify Module (CSIM) Application Definition File (ADF) structure. The new DF-Device_applets directory is created to store device applets such that they are 'global' in nature in that they can be run in both CDMA and GSM/UMTS modes. Device applets specific to CDMA or GSM/UMTS are allowed as well. In addition, each device applet has an attribute to indicate the platform it is intended for (i.e., Java, WinMobile, BREW, Google Android, etc.).

The contents in the DF-Device_applets directory are protected by card holder verification (CHV) or PIN (Personal Identification Number) for read and write access, except for operator pre-loaded device applets which are read-only (write access is protected). Per operator's choice, a device applet can be protected by CHV/PIN for read access, or it can be made available without CHV/PIN verification so that the device applet can be read anytime. Once the device applets have been stored on the smart card 108 by the device applet management apparatus 110, the smart card may be installed into the device 106 and the stored device applets will be available on that device.

Device 106 comprises the device applet management apparatus 120 which establishes communication with the smart card 108 after it is installed. The device applet management apparatus 120 is operable to read the directory structure of the smart card 108 and provide the user with a listing of available device applets (both downloaded 114 and preloaded 116). One or more device applets can then be selected by the device user for execution.

Therefore, in various implementations, a device applet management system is provided that operates to store downloaded and preloaded device applets on a smart card using a directory structure provided by the device applet management system. The smart card can be installed into other devices and the stored device applets will become available to those other devices. Thus, the system eliminates the requirement to re-download or re-purchase device applets acquired on a first device; so that those device applets can be used on a second device. It should be noted that the communication network 100 illustrates just one implementation and that other implementations of the device applet management system are possible.

Figure 2:
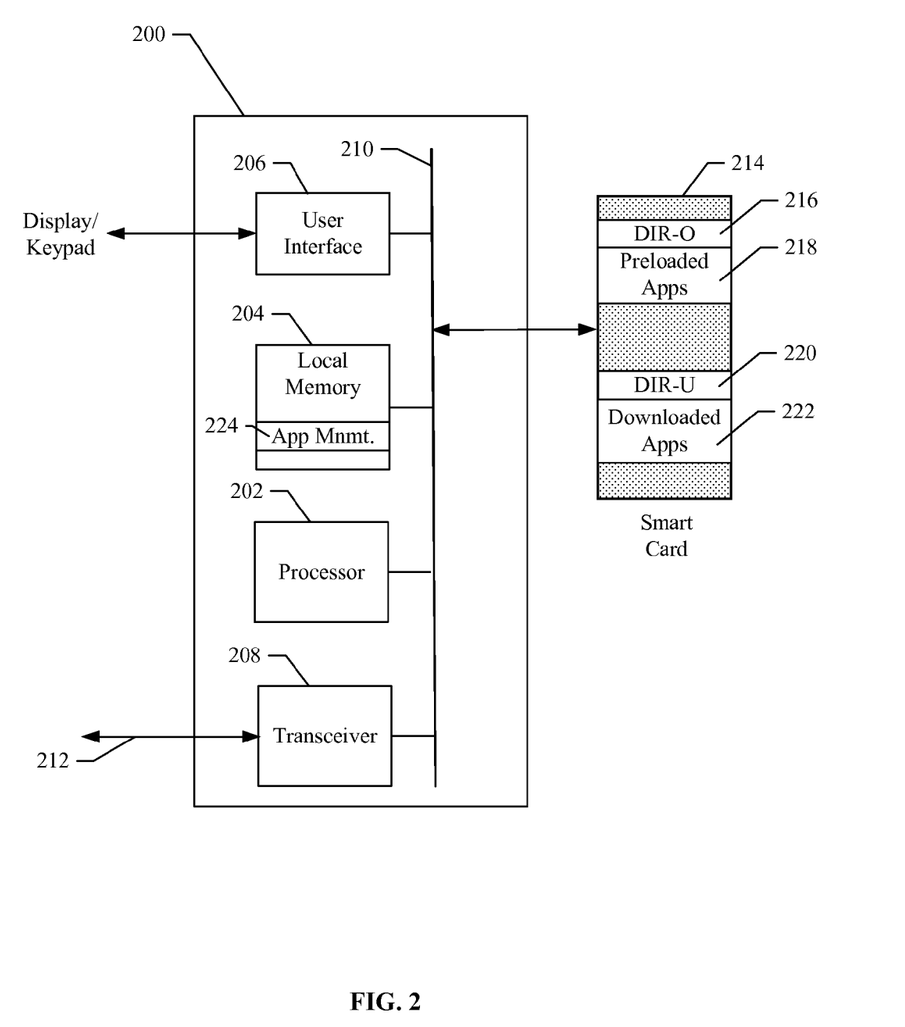
FIG. 2 shows an exemplary device applet management apparatus constructed in accordance with the device applet management system.

FIG. 2 shows an exemplary device applet management apparatus 200 constructed in accordance with the device applet management system. For example, the apparatus 200 is suitable for use as either of the device applet management apparatuses 110 or 120 shown in FIG. 1. The device applet management apparatus 200 comprises processor 202, local memory 204, user interface 206, and transceiver 208 all coupled to communicate over data bus 210. It should be noted that the device applet management apparatus 200 is just one implementation and that other implementations are possible.

The transceiver 208 comprises hardware and/or hardware executing software that operates to allow the device applet management apparatus 200 to communicate data or other information over a communication link 212 with remote devices or systems. For example, the transceiver 208 is operable to receive device applets, device information, or other information from network servers, (such as the server 102 shown in FIG. 1) via the communication link 212. The transceiver 208 is also operable to transmit requests, device information, or user information to network servers via the communication link 212. The communication link 212 comprises a wireless or wired link having one or more communication channels, such as forward, reverse, paging, broadcast/multicast, control channels and/or any other type of communication channel.

The local memory 204 comprises RAM, ROM, EEPROM or any other type of memory device that operates to allow information to be stored and retrieved at a device. The memory 204 is operable to store information such as user profiles, device applets, directories and/or any other type of information. Information stored in the memory 204 is accessible to other functions of device applet management apparatus 200 using the bus 210. The memory 204 comprises a device applet management program 224 that can be executed by the processor 202 to provide the functions of the device applet management system.

The user interface 206 comprises at least one of a CPU, processor, gate array, hardware logic, memory elements, and/or hardware executing software. The user interface 206 operates to communicate with a device user to receive user input or to provide information to the device user through a device display. The user interface 206 typically operates under the control of the processor 202 but may also operate to provide user interaction with any other function at the device applet management apparatus 200.

A smart card 214 is shown that is coupled to the bus 210. For example, the smart card may be any type of UICC card. The smart card 214 can be installed into and removed from a device that includes the device applet management apparatus 200. When the smart card 214 is installed into the device, the smart card 214 is coupled to the bus 210 to allow communication with other functional elements of the device applet management apparatus 200. The smart card 214 is operable to store any type of device applet, program, data or other information. For example, the smart card 214 is operable to store preloaded device applets 218 and downloaded device applets 222.

The processor 202 comprises at least one of a CPU, processor, gate array, hardware logic, memory elements, and/or hardware executing software. The processor 202 operates to control the operation of the device applet management apparatus 200 so that device applets can be stored and retrieve from the smart card 214.

During operation, the processor 202 operates to control the transceiver 212 to download one or more device applets. The processor 202 then generates a directory structure (DIR-U) 220 which is stored with the downloaded device applets 222 on the smart card 214. The directory structure DIR-U 220 operates to "globalize" the downloaded device applets 222 so that they will be accessible to another device when the smart card is installed in that other device.

The processor 202 utilizes the local memory 204 as storage to allow downloaded device applets to be temporarily stored while the DIR-U 220 is created. The processor 202 may also obtain user inputs from the user interface 206 which operate to determine the device applets to download or provide other parameters that can affect the operation of system.

The processor 202 also operates to read operator preloaded device applets 218 from the smart card 214 and create another directory structure (DIR-O) 216 that is stored back on to the smart card 214 with the preloaded device applets 218. Thus, the preloaded device applets will also be "globalized" and accessible from the smart card 214 when installed on other devices.

In various implementations, the device applet management system comprises a computer program product having one or more program instructions ("instructions") or sets of "codes" stored or embodied on a computer-readable medium. When the codes are executed by at least one processor, for instance, processor 202, their execution causes the processor 202 to provide the functions of the device applet management system described herein. For example, the computer-readable medium comprises a floppy disk, CDROM, memory card, FLASH memory device, RAM, ROM, or any other type of memory device or computer-readable medium that interfaces to the device applet management apparatus 200. In another aspect, the sets of codes may be downloaded into the device applet management apparatus 200 from an external device or communication network resource. The sets of codes, when executed, operate to provide aspects of the device applet management system described herein.

Figure 3:
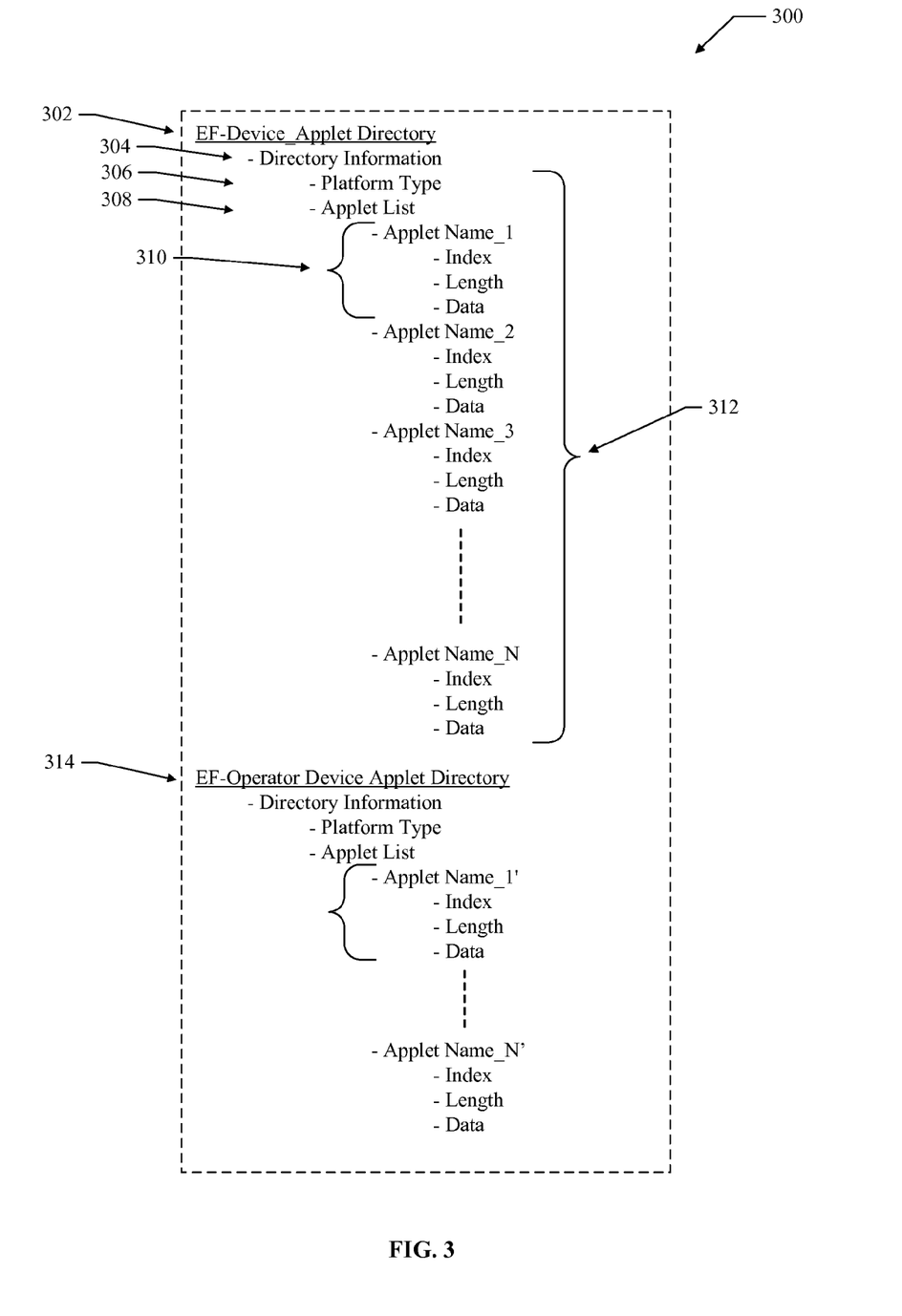
FIG. 3 shows an exemplary directory structure for storing device applets on a smart card in accordance with the device applet management system.

FIG. 3 shows an exemplary directory structure 300 for storing device applets on a smart card in accordance with the device applet management system. For example, the directory structures DIR-O 216 and DIR-U 220 are created by the processor 202 and stored on the smart card 214 as part of the preloaded apps 216 and/or the downloaded apps 218. The new DF-device applets comprise the following EFs.

1. EF-Device_applet Directory 302 which contains multiple instances 312 of the following.
   a. Device applet Directory Information 304 which contains the following fields for a particular application platform or operating system (OS).
      1. Platform Type 306 (such as WindowsMobile, BREW, Linux, Android, Symbian or any other platform type).
      2. Device applet List 308 comprising one or more device applet indices, each pointing to a device applet in EF-Device applet Data below. In another implementation, the Device applet List 308 is a list of EF File identifiers and there may be multiple instances of EF-Device appletData that are identified by their unique EF File identifier. Those EF File identifiers are not static and can be assigned dynamically by the Smart Card when the device stores a new device applet to the card.
2. EF-Device_applet Data which contains all device applets pointed to by the Device applet List and comprises multiple instances 310 of the following.
   a. Device applet Name
      1. Index
      2. Length
      3. Data As discussed above, there can be multiple instances of EF-Device applet Data each having its own EF File identifier with an identical data structure. In this case, the Index field is not used.

3. EF-Operator Device_applet Directory 314 which is used for operator pre-loaded Device applets (which may be read-only). In this implementation, the EF-Operator Device_applet Directory comprises the same data structures as described above including EF-Operator Device-_applet Data shown at 316.

It should be note that other implementations are possible. For example, in the EF-Device applet Directory, a first level of information can comprise the Platform Type and a second level can comprise the Device applet List containing device applets for that platform type. There can be multiple instances of these two levels.

Figure 4:
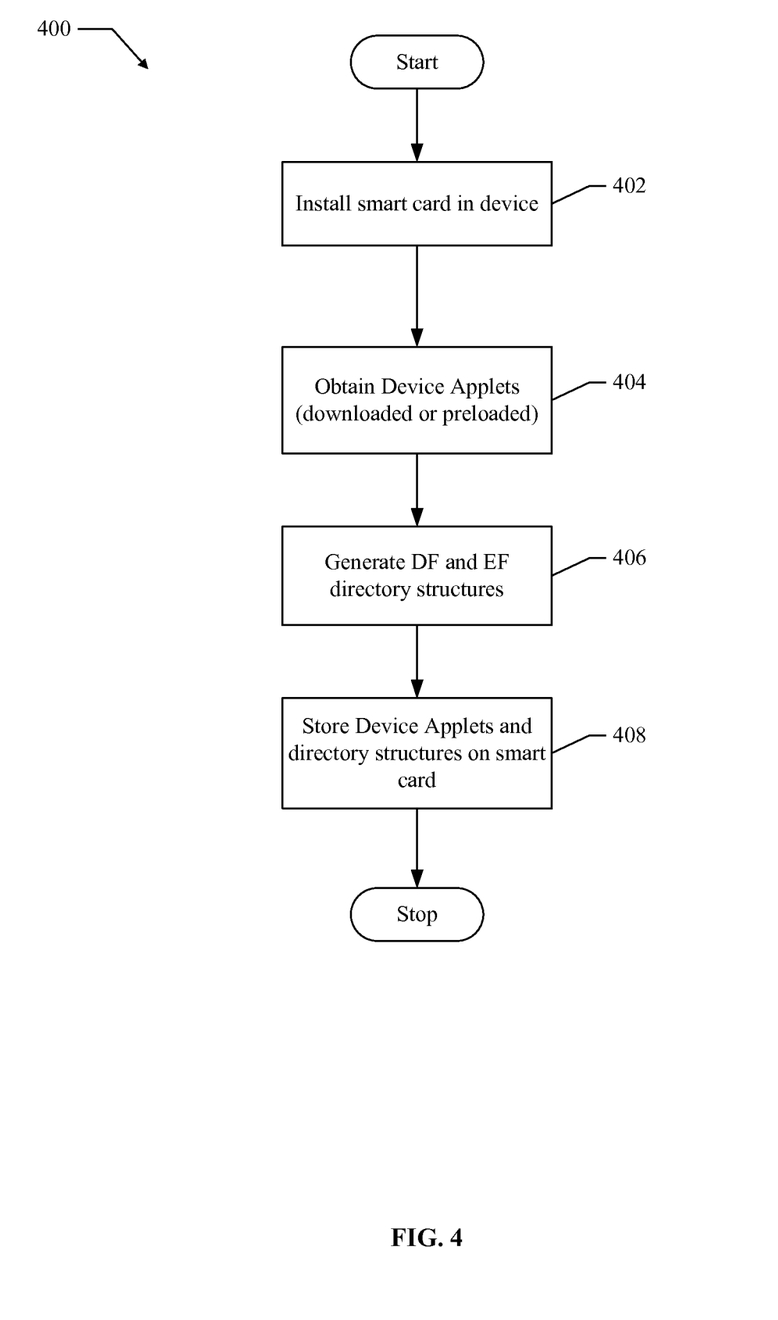
FIG. 4 shows an exemplary method for storing device applets on a smart card in accordance the device applet management system.

FIG. 4 shows an exemplary method 400 for storing device applets on a smart card in accordance the device applet management system. For clarity, the method 400 is described below with reference to the device applet management apparatus 200. In one implementation, the processor 202 executes one or more sets of codes of the device applet management program 224 to control the device applet management apparatus 200 to perform the functions described below.

At block 402, a smart card is installed in a device that comprises the device applet management system. For example, the device may be device 104 shown in FIG. 1 that comprises the device applet management apparatus and the smart card may be the smart card 108 also shown in FIG. 1. The smart card is a UICC card or any other suitable type of smart card.

At block 404, one or more device applets are obtained. In one implementation, the device applets are downloaded from a device applet download server using the transceiver 208. In another implementation, preloaded device applets are retrieved from the installed smart card. The obtained device applets are stored in the local memory 204.

At block 406, DF and EF directory structures are generated. For example, the processor 202 generates the directory structures shown in FIG. 3 for one or more device applets so that the device applets are associated with a platform type. In one implementation, the processor 202 automatically generates the DF and EF directory structures when a device applet is downloaded. In another implementation, the device user provides input using the user interface 206 to manually direct the processor 202 to generate the DF and EF directory structures for any selected device applet. Also, the device applet management system allows device applets to be copied to the smart card at any time. Furthermore, the processor 202 maintains a mapping table in the local memory 204 that maps device applet identifiers to the device applet indices on the smart card so that the device applets can be located easily as needed. In one implementation, the processor 202 generates the directory structure dynamically (i.e., creates a new directory and associated files at run time), statically (i.e., creates a new directory and files when the smart card is configured/programmed before use), or a combination of both (i.e., directory and some files are statically created before use, and some new files are dynamically created by the device at run time).

In another implementation, the processor 202 uses space in DF-Device applets directory to store any application data either as part of the device applet or in a separate device applet memory space in the DF-Device applets directory (e.g. UI widgets, themes, screen savers, etc.) During operation, the processor 202 can run the device applets directly from the smart card and allows the user to add and delete user downloaded device applets on the smart card at any time.

In another implementation, the processor 202 configures the DF and EF directory structures so that multiple instances of a particular device applet are identified with multiple platform types, respectively. This allows the particular device applet to be accessed on the smart card by any device supporting at least one of the multiple platform types.

At block 408, the DF and EF directory structures and associated device applets are stored on the smart card. For example, the processor 202 stores the information to the smart card using the bus 210. In one implementation, the DF and EF directory structures are stored using a card holder verification (CHV) service and/or a personal identification number (PIN) service. In one implementation, one or more device applets in the directory structure are stored on a smart card so that when the smart card is in communication with a second device that supports a selected platform type, the corresponding device applets associated with the selected platform type are accessible to the second device.

Therefore, the method 400 is performed by a device applet management apparatus at a first device to store device applets on a smart card for later access by a second device. It should be noted that the method 400 is just one implementation and that the operations of the method 400 may be rearranged or otherwise modified such that other implementations are possible.

Figure 5:
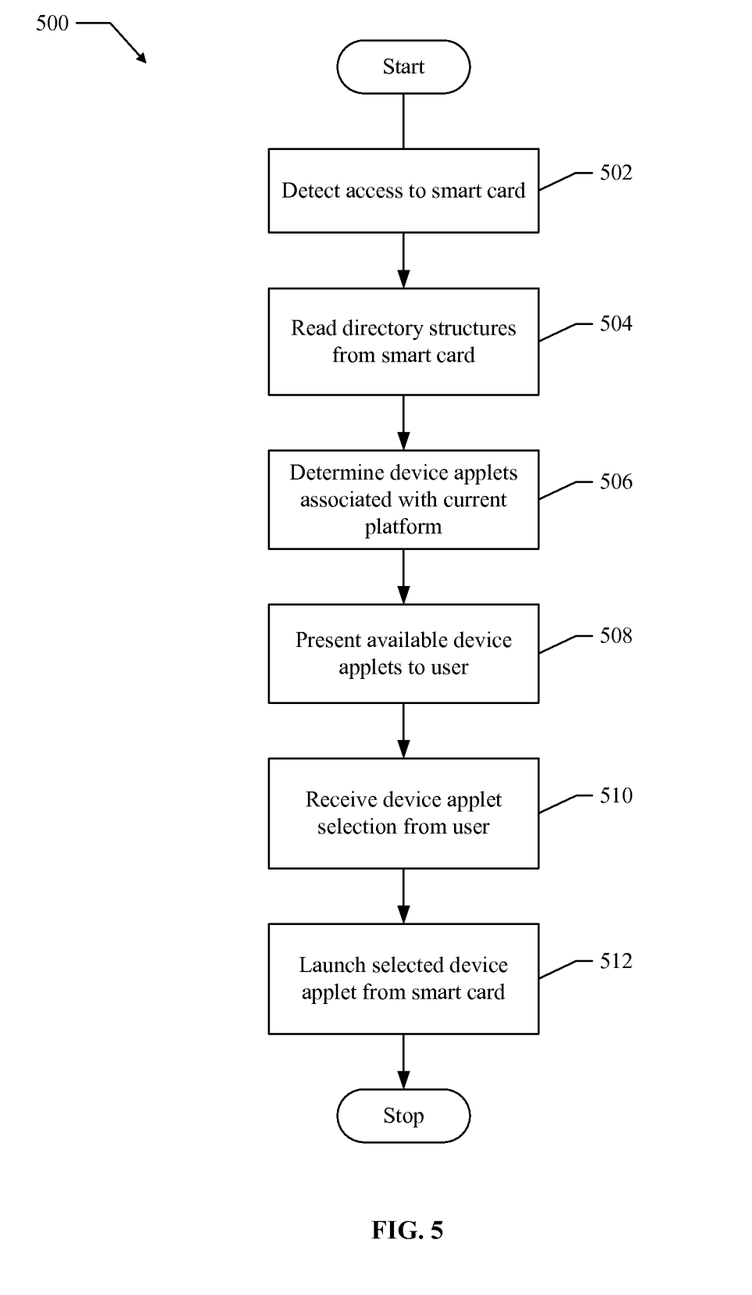
FIG. 5 shows an exemplary method for retrieving device applets from a smart card in accordance with the device applet management system.

FIG. 5 shows an exemplary method 500 for retrieving device applets from a smart card in accordance with the device applet management system. For clarity, the method 500 is described below with reference to the device applet management apparatus 200. In one implementation, the processor 202 executes one or more sets of codes of the device applet management program 224 to control the device applet management apparatus 200 to perform the functions described below.

At block 502, access to a smart card is detected. For example, a UICC card is installed in a portable device, such as a mobile phone. The smart card comprises one or more device applets that were previously stored on the smart card using implementations of the device applet management system disclosed herein. Thus, the smart card comprises one or more device applets and associated information stored in a directory structure provided by the device applet management system as illustrated in FIG. 3.

At block 504, a directory structure on the smart card is read so that device applets stored on the smart card can be identified. In one implementation, the processor 202 reads the directory structure from the smart card.

At block 506, device applets on the smart card that are associated with the current device platform are determined. In one implementation, the processor 202 is aware of the current device platform and analyzes the EF device applet directory and the EF operator device applet directory to determine device applets on the smart card that are associated with the current device platform.

At block 508, the device applets associated with the current device platform are presented to a device user. In one implementation, the processor 202 controls the user interface 206 to display these device applets to a device user. For example, the device comprises a display which is used to display device applets on the smart card available for use with the current device platform.

At block 510, a device user inputs device applet selection information to select one or more device applets to be launched. In one implementation, the device user communicates device applet selections using the user interface 206.

At block 512, the selected device applets are launched. In one implementation, the processor 202 retrieves the selected device applets from the smart card and launches those device applets. In one implementation, device applets on the smart card (either preloaded or downloaded) are freely provided by service providers as a value added service (e.g. Instant Messaging client), as a promotion of premier services. The device user can execute the free device applet to decide if the premier service if desired. If so, the free device applet operates to allow the device user to download the premier device applet. If the premier device applet is downloaded, it too will be stored on the smart card in accordance with the device applet management system described herein. Thus, the system allows a first device applet to provide access to one or more additional device applets based on user input.

Therefore, the method 500 is performed by a device applet management apparatus at a second device to access device applets on a smart card previously stored by a first device. It should be noted that the method 500 is just one implementation and that the operations of the method 500 may be rearranged or otherwise modified within the scope of the various aspects such that other implementations are possible.

Figure 6:
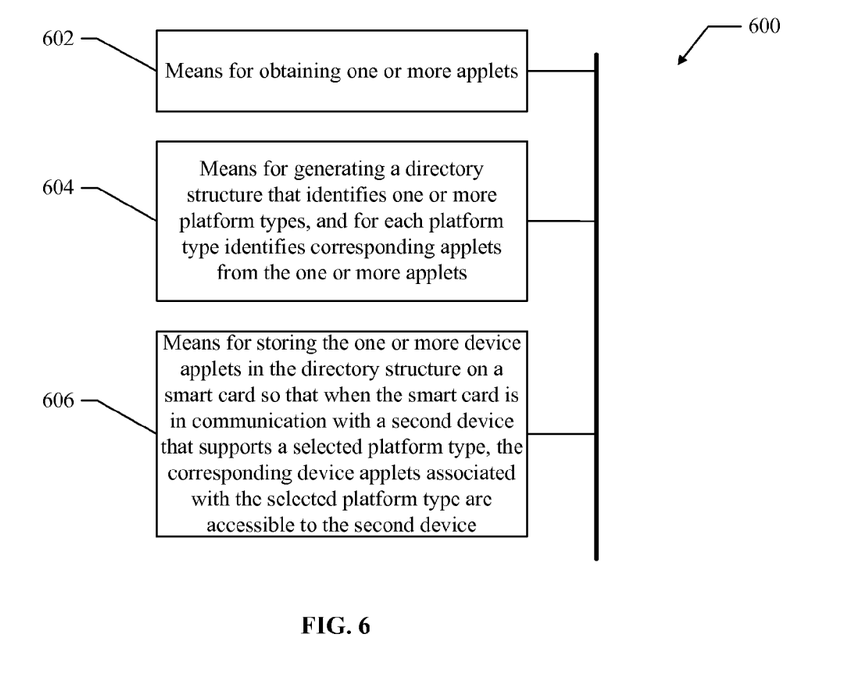
FIG. 6 shows an exemplary device applet management apparatus constructed in accordance with the device applet management system.

FIG. 6 shows an exemplary device applet management apparatus 600 for use in aspects of a device applet management system. For example, the device applet management apparatus 600 is suitable for use as the device applet management apparatus 110 shown in FIG. 1. In an aspect, the device applet management apparatus 600 is implemented by at least one integrated circuit comprising one or more modules configured to provide aspects of a device applet management system as described herein. For example, in an aspect, each module comprises hardware and/or hardware executing software.

The device applet management apparatus 600 comprises a first module comprising means (602) for obtaining one or more device applets, which in an aspect comprises the transceiver 208. The device applet management apparatus 600 also comprises a second module comprising means (604) for generating a directory structure that identifies one or more platform types, and for each platform type identifies corresponding device applets from the one or more device applets, which in an aspect comprises the processor 202. The device applet management apparatus 600 also comprises a third module comprising means (606) for storing the one or more device applets in the directory structure on a smart card so that when the smart card is in communication with a second device that supports a selected platform type, the corresponding device applets associated with the selected platform type are accessible to the second device, which in an aspect comprises the processor 202.

Figure 7:
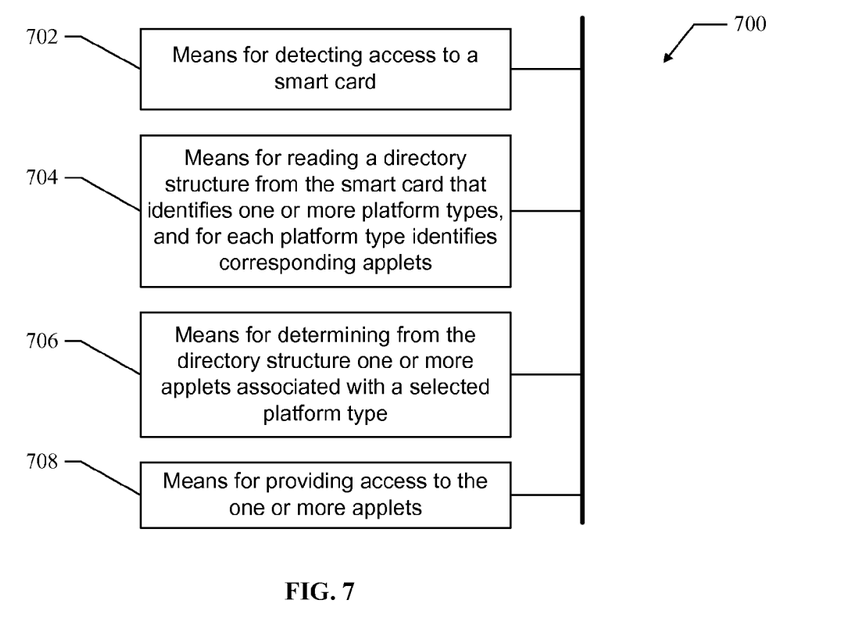
FIG. 7 shows an exemplary device applet management apparatus constructed in accordance with the device applet management system.

FIG. 7 shows an exemplary device applet management apparatus 700 for use in aspects of a device applet management system. For example, the device applet management apparatus 700 is suitable for use as the device applet management apparatus 110 shown in FIG. 1. In an aspect, the device applet management apparatus 700 is implemented by at least one integrated circuit comprising one or more modules configured to provide aspects of a device applet management system as described herein. For example, in an aspect, each module comprises hardware and/or hardware executing software.

The device applet management apparatus 700 comprises a first module comprising means (702) for detecting access to a smart card, which in an aspect comprises the processor 202. The device applet management apparatus 700 also comprises a second module comprising means (704) for reading a directory structure from the smart card that identifies one or more platform types, and for each platform type identifies corresponding device applets, which in an aspect comprises the processor 202. The device applet management apparatus 700 also comprises a third module comprising means (706) for determining from the directory structure one or more device applets associated with a selected platform type, which in an aspect comprises the processor 202. The device applet management apparatus 700 also comprises a fourth module comprising means (708) for providing access to the one or more device applets, which in an aspect comprises the user interface 206.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a device applet management system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for managing device applets on a smart card, the method comprising:
obtaining one or more device applets on a smart card in communication with a first device;

generating a directory structure on the smart card that identifies one or more platform types, and that for each platform type identifies corresponding device applets from the one or more device applets, wherein the generating includes generating the directory structure to associate multiple instances of a selected device applet with multiple platform types so that a selected device applet can be accessed on the smart card by any device supporting at least one of the multiple platform types;

storing the one or more device applets in the directory structure on the smart card; and allowing access to the stored device applets based on a platform type when the smart card is in communication with a second device that supports the one or more platform types.

2. The method of claim 1, wherein the smart card is one of a Universal Integrated Circuit Card (UICC) or an Integrated Circuit Card (ICC).

3. The method of claim 1, wherein said storing comprises storing the directory structure using at least one of a card holder verification (CHV) service and a personal identification number (PIN) service.

4. The method of claim 1, wherein said obtaining comprises downloading the one or more device applets from a device applet download server.

5. The method of claim 4, wherein said downloading comprises downloading the one or more device applets in one or more wireless communications.

6. The method of claim 1, wherein said obtaining comprises obtaining the one or more device applets from the smart card as preloaded device applets.

7. The method of claim 6, wherein a selected preloaded device applet identifies other device applets to be obtained based on user input.

8. The method of claim 1, wherein said obtaining comprises downloading a first portion of the one or more device applets from an device applet download server and obtaining a second portion of the one or more device applets from the smart card.

9. The method of claim 1, wherein the device is a portable device.

10. The method of claim 1, wherein said generating comprises generating the directory structure dynamically, statically or any combination thereof.

11. An apparatus for managing device applets on a smart card, the apparatus comprising:

a transceiver configured to obtain one or more device applets on a smart card in communication with a first device; and a processor coupled to the transceiver and configured to:

generate a directory structure on the smart card that identifies one or more platform types, and that for each platform type identifies corresponding device applets from the one or more device applets, wherein the processor is configured to generate the directory structure to associate multiple instances of a selected device applet with multiple platform types so that a selected device applet can be accessed on the smart card by any device supporting at least one of the multiple platform types; and store the one or more device applets in the directory structure on the smart card; and allow access to the stored device applets based on a platform type when the smart card is in communication with a second device that supports the one or more platform types.

12. The apparatus of claim 11, wherein the smart card is one of a Universal Integrated Circuit Card (UICC) or an Integrated Circuit Card (ICC).

13. The apparatus of claim 11, wherein said processor is configured to store the directory structure using at least one of a card holder verification (CHV) service and a personal identification number service.

14. The apparatus of claim 11, wherein the transceiver is configured to download the one or more device applets from a device applet download server.

15. The apparatus of claim 11, wherein the transceiver is configured to download the one or more device applets in one or more wireless communications.

16. The apparatus of claim 11, wherein the processor is configured to obtain the one or more device applets from the smart card as preloaded device applets.

17. The apparatus of claim 16, wherein a selected preloaded device applet identifies other device applets to be obtained based on user input.

18. The apparatus of claim 11, wherein said processor is configured to obtain a first portion of the one or more device applets from a device applet download server and to obtain a second portion of the one or more device applets from the smart card.

19. The apparatus of claim 11, wherein the device is a portable device.

20. The apparatus of claim 11, wherein said processor is configured to generate the directory structure dynamically, statically or any combination thereof.

21. An apparatus for managing device applets on a smart card, the apparatus comprising:

means for obtaining one or more device applets on a smart card in communication with a first device;

means for generating a directory structure on the smart card that identifies one or more platform types, and that for each platform type identifies corresponding device applets from the one or more device applets, wherein the means for generating comprises means for associating multiple instances of a selected device applet with multiple platform types so that the selected device applet can be accessed by any device supporting at least one of the multiple platform types; and means for storing the one or more device applets in the directory structure on the smart card; and means for allowing access to the stored device applets based on a platform type when the smart card is in communication with a second device that supports the one or more platform types.

22. The apparatus of claim 21, wherein the smart card is one of a Universal Integrated Circuit Card (UICC) or an Integrated Circuit Card (ICC).

23. The apparatus of claim 21, wherein said means for storing comprises means for storing the directory structure using at least one of a card holder verification (CHV) service and a personal identification number service.

24. The apparatus of claim 21, wherein said means for obtaining comprises means for downloading the one or more device applets from a device applet download server.

25. The apparatus of claim 24, wherein said means for downloading comprises means for downloading the one or more device applets in one or more wireless communications.

26. The apparatus of claim 21, wherein said means for obtaining comprises means for obtaining the one or more device applets from the smart card as preloaded device applets.

27. The apparatus of claim 26, wherein a selected preloaded device applet identifies other device applets to be obtained based on user input.

28. The apparatus of claim 21, wherein said means for obtaining comprises means for downloading a first portion of the one or more device applets from a device applet download server and obtaining a second portion of the one or more device applets from the smart card.

29. The apparatus of claim 21, wherein the device is a portable device.

30. The apparatus of claim 21, wherein said means for generating comprises means for generating the directory structure dynamically, statically or any combination thereof.

31. A computer program product for managing device applets on a smart card, the computer program product comprising:
   a non-transitory computer-readable medium embodying codes executable by a processor to:
   obtain one or more device applets on a smart card in communication with a first device;
   generate a directory structure on the smart card that identifies one or more platform types, and that for each platform type identifies corresponding device applets from the one or more device applets, wherein said codes are configured to cause the processor to associate multiple instances of a selected device applet with multiple platform types so that a selected device applet can be accessed by any device supporting at least one of the multiple platform types; and
   store the one or more device applets in the directory structure on the smart card; and
   allow access to the stored device applets based on a platform type when the smart card is in communication with a second device that supports the one or more platform types.

32. The computer-readable medium of claim 31, wherein the smart card is one of a Universal Integrated Circuit Card (UICC) or an Integrated Circuit Card (ICC).

33. The computer-readable medium of claim 31, wherein said codes are configured to cause the processor to store the directory structure using at least one of a card holder verification (CHV) service and a personal identification number service.

34. The computer-readable medium of claim 31, wherein said codes are configured to cause the processor to download the one or more device applets from a device applet download server.

35. The computer-readable medium of claim 31, wherein said codes are configured to cause the processor to download the one or more device applets in one or more wireless communications.

36. The computer-readable medium of claim 31, wherein said codes are configured to cause the processor to obtain the one or more device applets from the smart card as preloaded device applets.

37. The computer-readable medium of claim 36, wherein a selected preloaded device applet identifies other device applets to be obtained based on user input.

38. The computer-readable medium of claim 31, wherein said codes are configured to cause the processor to obtain a first portion of the one or more device applets from a device applet download server and to obtain a second portion of the one or more device applets from the smart card.

39. The computer-readable medium of claim 31, wherein the device is a portable device.

40. The computer-readable medium of claim 31, wherein said codes are configured to cause the processor to generate the directory structure dynamically, statically or any combination thereof.

* * * * *